US010266025B2

(12) United States Patent
Lorenz et al.

(10) Patent No.: US 10,266,025 B2
(45) Date of Patent: Apr. 23, 2019

(54) SUSPENSION MODULE HAVING AN AIR SPRING PEDESTAL

(71) Applicant: ArvinMeritor Technology, LLC, Troy, MI (US)

(72) Inventors: Edwin D. Lorenz, Grand Blanc, MI (US); Adam P. Sadlik, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/498,557

(22) Filed: Apr. 27, 2017

(65) Prior Publication Data
US 2017/0320365 A1 Nov. 9, 2017

Related U.S. Application Data

(60) Provisional application No. 62/332,884, filed on May 6, 2016.

(51) Int. Cl.
B60G 3/26 (2006.01)
B60G 7/00 (2006.01)
B60G 11/27 (2006.01)
B60G 11/28 (2006.01)
B60G 3/20 (2006.01)

(52) U.S. Cl.
CPC ............... B60G 3/26 (2013.01); B60G 7/001 (2013.01); B60G 11/27 (2013.01); B60G 11/28 (2013.01); B60G 3/20 (2013.01); B60G 2200/14 (2013.01); B60G 2202/152 (2013.01); B60G 2202/1524 (2013.01); B60G 2204/126 (2013.01); B60G 2204/148 (2013.01)

(58) Field of Classification Search
CPC .......... B60G 7/001; B60G 3/20; B60G 11/27; B60G 11/28; B60G 2204/148; B60G 2200/14; B60G 2202/152; B60G 2204/126; B60G 2202/1524
See application file for complete search history.

(56) References Cited

U.S. PATENT DOCUMENTS 2,866,651 A * 12/1958 Powell .................... B60G 3/26
267/251
2,971,772 A 2/1961 Tantlinger et al.
(Continued)

FOREIGN PATENT DOCUMENTS

BR    PI0405014 A    6/2006
CN    204399316 U    6/2015
(Continued)

OTHER PUBLICATIONS

European Patent Office, Extended European Search Report for the corresponding European Patent Application No. 17169640.4 dated Sep. 7, 2017.
(Continued)

Primary Examiner — Karen Beck
(74) Attorney, Agent, or Firm — Brooks Kushman P.C.

(57) ABSTRACT

A suspension module having a knuckle, a pedestal, an upper control arm, and first and second air springs. The pedestal may be disposed on the knuckle and may support the first and second air springs. The upper control arm may be pivotally mounted to the pedestal between the first and second air springs.

20 Claims, 5 Drawing Sheets

(56) References Cited

U.S. PATENT DOCUMENTS

| | | | |
|---|---|---|---|
| 2,998,264 A | 8/1961 | Stump | |
| 3,007,716 A * | 11/1961 | Maharick | B60G 11/62 267/67 |
| 3,477,738 A | 11/1969 | Manning | |
| 4,174,855 A | 11/1979 | Vandenberg | |
| 4,274,338 A * | 6/1981 | Uozumi | B62D 1/265 104/119 |
| 4,313,619 A * | 2/1982 | Hailer | B60G 3/20 280/124.138 |
| 4,813,704 A * | 3/1989 | Smith | B60G 3/265 280/124.109 |
| 4,974,872 A * | 12/1990 | Riese | B60G 3/00 280/124.145 |
| 5,396,968 A | 3/1995 | Hasebe et al. | |
| 5,413,462 A | 5/1995 | Alberni | |
| 5,879,265 A | 3/1999 | Bek | |
| 5,927,417 A | 7/1999 | Brunner et al. | |
| 6,290,244 B1 | 9/2001 | Hosoya | |
| 6,349,782 B1 | 2/2002 | Sekiya et al. | |
| 6,357,769 B1 | 3/2002 | Omundson et al. | |
| 6,428,027 B1 * | 8/2002 | Stuart | B60G 9/00 280/124.1 |
| 6,840,525 B1 | 1/2005 | Griffiths | |
| 6,866,295 B2 | 3/2005 | Ziech et al. | |
| 7,464,779 B2 | 12/2008 | Grabmaier et al. | |
| 7,819,411 B2 * | 10/2010 | Eshelman | B60G 3/20 280/124.135 |
| 7,971,890 B2 | 7/2011 | Richardson | |
| 8,579,308 B2 | 11/2013 | Weeks et al. | |
| 8,640,801 B2 | 2/2014 | Hennings et al. | |
| 8,678,118 B2 | 3/2014 | Takenaka et al. | |
| 8,960,341 B2 | 2/2015 | Weber | |
| 9,221,496 B2 | 12/2015 | Barr et al. | |
| 9,266,423 B2 | 2/2016 | Hoshinoya et al. | |
| D814,979 S * | 4/2018 | Cantuern | D12/160 |
| 2002/0163174 A1 | 11/2002 | Bell et al. | |
| 2003/0064846 A1 | 4/2003 | Klemen et al. | |
| 2003/0098564 A1 | 5/2003 | VanDenberg et al. | |
| 2003/0122340 A1 | 7/2003 | Varela | |
| 2004/0150142 A1 | 8/2004 | Warinner et al. | |
| 2004/0183271 A1 * | 9/2004 | Galazin | B60G 9/003 280/124.128 |
| 2006/0192361 A1 | 8/2006 | Anderson et al. | |
| 2006/0208447 A1 * | 9/2006 | Eshelman | B60G 3/20 280/124.135 |
| 2007/0259747 A1 | 11/2007 | Thomas et al. | |
| 2008/0179116 A1 | 7/2008 | Ikenoya et al. | |
| 2008/0315546 A1 | 12/2008 | Kucinski et al. | |
| 2009/0014223 A1 | 1/2009 | Jones et al. | |
| 2009/0057050 A1 | 3/2009 | Shino et al. | |
| 2010/0025131 A1 | 2/2010 | Gloceri et al. | |
| 2010/0038877 A1 * | 2/2010 | Cortez | B60G 11/113 280/124.175 |
| 2010/0117318 A1 | 5/2010 | Grozev et al. | |
| 2010/0276901 A1 | 11/2010 | Richardson et al. | |
| 2011/0214947 A1 | 9/2011 | Tuomas | |
| 2013/0175779 A1 | 7/2013 | Kvien et al. | |
| 2014/0327220 A1 | 11/2014 | Holt et al. | |
| 2015/0266373 A1 | 9/2015 | Wang | |
| 2016/0076610 A1 | 3/2016 | White et al. | |
| 2017/0320365 A1 * | 11/2017 | Lorenz | B60G 3/26 |
| 2017/0320366 A1 | 11/2017 | Milton et al. | |
| 2017/0320367 A1 | 11/2017 | Milton et al. | |
| 2017/0320382 A1 | 11/2017 | Milton et al. | |
| 2017/0320522 A1 | 11/2017 | Lorenz et al. | |

FOREIGN PATENT DOCUMENTS

| | | | |
|---|---|---|---|
| DE | 3136305 A1 | 3/1983 | |
| DE | 19860230 A1 | 2/2000 | |
| DE | 102011084858 A1 | 4/2013 | |
| DE | 212013000235 U1 | 7/2015 | |
| EP | 093168 A1 | 7/1999 | |
| EP | 0742113 B1 | 10/2001 | |
| EP | 1724130 A1 | 11/2006 | |
| EP | 1900554 B1 | 11/2011 | |
| EP | 1628854 B1 | 7/2012 | |
| JP | H06064419 A | 3/1994 | |
| WO | 0123245 A1 | 4/2001 | |
| WO | 2001/51300 A1 | 7/2001 | |
| WO | 2015110965 A2 | 7/2015 | |
| WO | 2017196776 A1 | 11/2017 | |
| WO | 2017196778 A1 | 11/2017 | |
| WO | 20171966333 A1 | 11/2017 | |
| WO | WO-2017196778 A1 * | 11/2017 | B60G 3/06 |

OTHER PUBLICATIONS

United States Patent and Trademark Office, U.S. Appl. No. 15/437,823, filed Feb. 21, 2017.

International Searching Authority, International Search Report and Written Opinion for International Application Serial No. PCT/US17/31056, dated Sep. 6, 2017.

International Searching Authority, International Search Report and Written Opinion for International Application Serial No. PCT/US17/31653, dated Jul. 17, 2017.

International Searching Authority, International Search Report and Written Opinion for International Application Serial No. PCT/US17/31651, dated Jul. 20, 2017.

United States Patent and Trademark Office, Amendment under 37 C.F.R §1.116 for U.S. Appl. No. 15/357,350, dated Jul. 17, 2018.

United States Patent and Trademark Office, Amendment under 37 C.F.R §1.111 for U.S. Appl. No. 15/357,350, dated Feb. 5, 2018.

United States Patent and Trademark Office, Notice of Allowance and Fees Due for U.S. Appl. No. 15/357,350, dated Jul. 27, 2018.

United States Patent and Trademark Office, Non-Final Office Action for U.S. Appl. No. 15/357,350, dated Oct. 6, 2017.

United States Patent and Trademark Office, Final Office Action for U.S. Appl. No. 15/357,350, dated Apr. 17, 2018.

United States Patent and Trademark Office, Non-Final Office Action for U.S. Appl. No. 15/366,452, dated Apr. 2, 2018.

United States Patent and Trademark Office, Non-Final Office Action for U.S. Appl. No. 15/366,472, dated Sep. 4, 2018.

United States Patent and Trademark Office, Non-Final Office Action for U.S. Appl. No. 15/366,472, dated Apr. 3, 2018.

U.S. Patent and Trademark Office, Final Office Action for U.S. Appl. No. 15/366,472, dated Dec. 11, 2018.

U.S. Patent and Trademark Office, Non-Final Office Action for U.S. Appl. No. 15/366,452, dated Dec. 14, 2018.

U.S. Patent and Trademark Office, Notice of Allowance and Fee(s) Due for U.S. Appl. No. 15/366,472, dated Feb. 27, 2019.

Trevor R. Milton, et al., Amendment Under 37 C.F.R. § 1.116 for Consideration Under After Final Pilot Program 2.0, for U.S. Appl. No. 15/366,472, filed with the United States Patent and Trademark Office on Feb. 11, 2019, via EFS-Web.

* cited by examiner

SUSPENSION MODULE HAVING AN AIR SPRING PEDESTAL

CROSS-REFERENCE TO RELATED APPLICATIONS

This application claims the benefit of U.S. provisional application Ser. No. 62/332,884, filed May 6, 2016, the disclosure of which is hereby incorporated in its entirety by reference herein.

TECHNICAL FIELD

This disclosure relates to a suspension module that has a pedestal that supports air springs.

BACKGROUND

A suspension module is disclosed in U.S. Pat. No. 8,579,308.

SUMMARY

In at least one embodiment, a suspension module is provided. The suspension module may include a knuckle, a pedestal, first and second air springs, and an upper control arm. The pedestal may be fixedly disposed on the knuckle. The first and second air springs may be disposed on the pedestal. The upper control arm may be pivotally mounted to the pedestal between the first and second air springs.

In at least one embodiment, a suspension module is provided. The suspension module may include a knuckle, a pedestal, first and second air springs, a lower control arm, and an upper control arm. The pedestal may be fixedly attached to the knuckle. The first and second air springs may be disposed on the pedestal. The lower control arm may be pivotally mounted to the knuckle at an end of the knuckle that may be disposed opposite the pedestal. The upper control arm may be pivotally mounted to the pedestal between the pedestal in the knuckle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
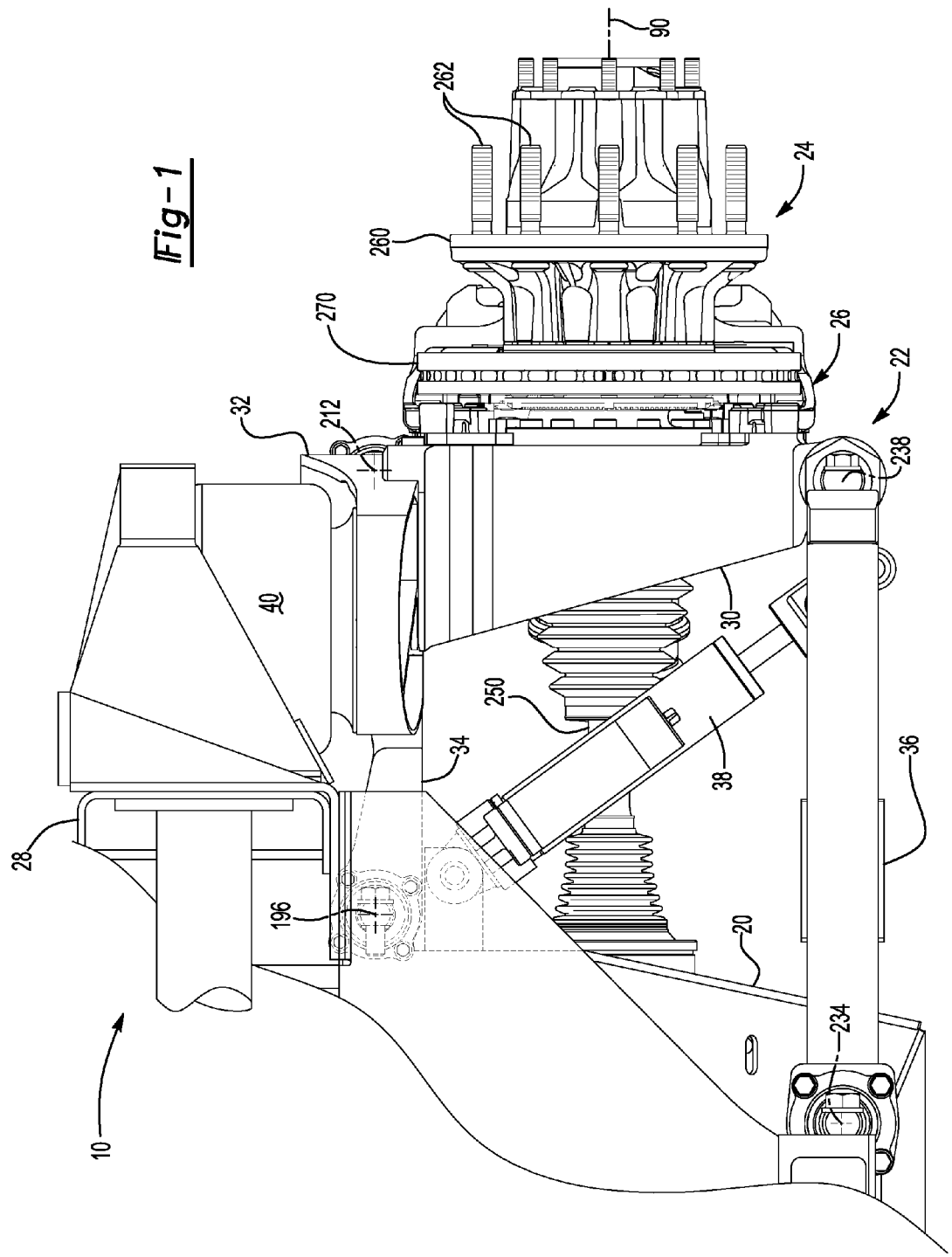
FIG. 1 is a side view of a portion of a vehicle that includes a suspension module.

Referring to FIG. 1, portion of a vehicle 10 is shown. The vehicle 10 may be a motor vehicle like a truck, bus, farm equipment, military transport or weaponry vehicle, or cargo loading equipment for land, air, or marine vessels. The vehicle 10 may include a subframe 20, a suspension module 22, a wheel end assembly 24, and a brake subsystem 26.

The subframe 20 may help provide the structure of the vehicle 10. The subframe 20 may be mounted to the chassis or frame rails 28 of the vehicle 10 and may support various components of the vehicle 10. For instance, the subframe 20 may receive an axle assembly, differential, or gearbox that may provide torque to a wheel end assembly 24. In addition, the subframe 20 may facilitate mounting of the suspension module 22 to the vehicle 10.

Figure 2:
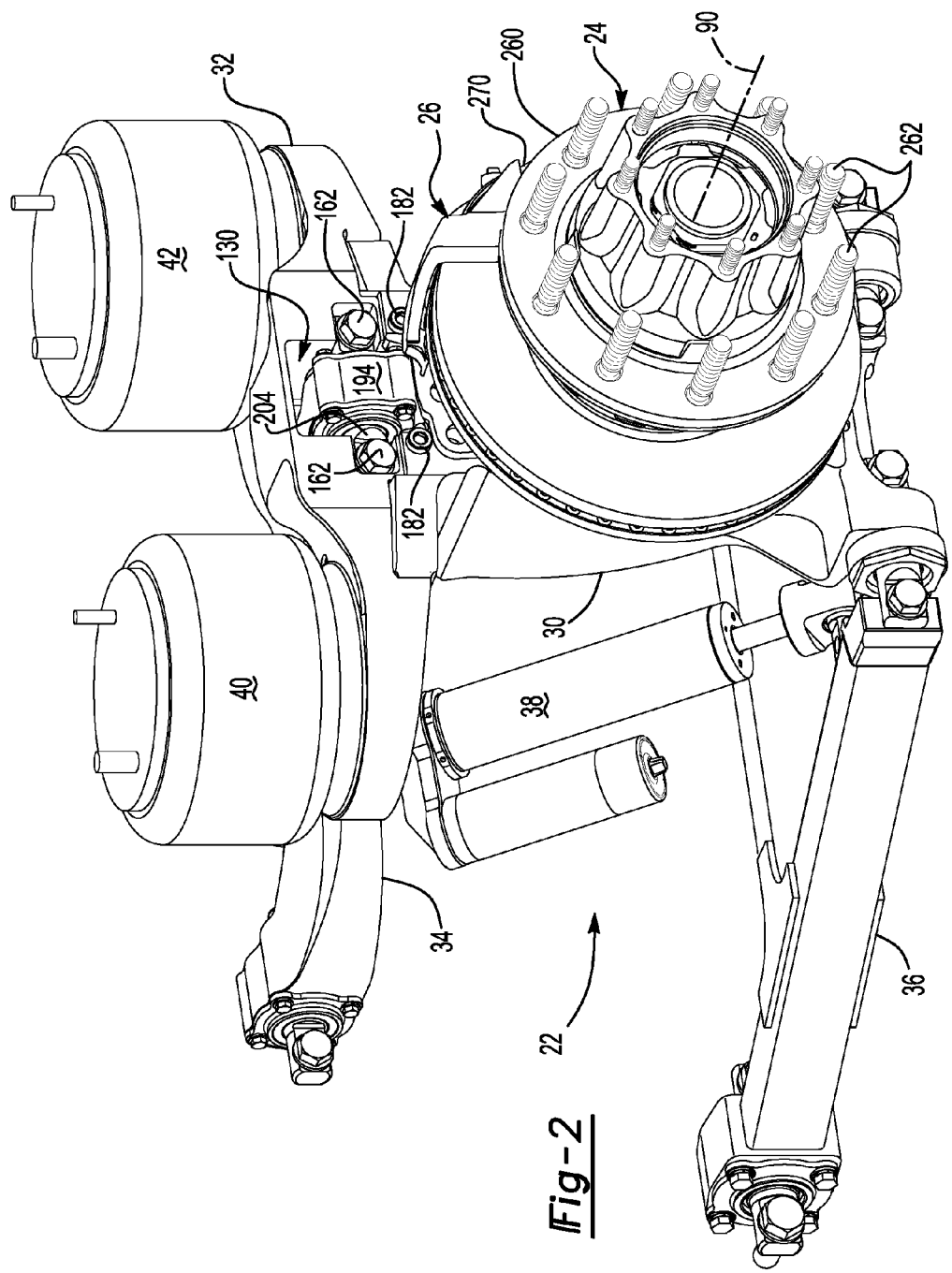
FIG. 2 is a perspective view of the suspension module supporting a wheel end assembly.

Referring to FIGS. 1 and 2, the suspension module 22 may connect the wheel end assembly 24 to the subframe 20 and/or the vehicle chassis to dampen vibrations, provide a desired level of ride quality, control vehicle ride height, or combinations thereof. The suspension module 22 may be an independent suspension system that may allow wheels to move up and down independently with respect to each other or without influence from another wheel on the axle. In at least one configuration, the suspension module 22 may include a knuckle 30, a pedestal 32, an upper control arm 34, a lower control arm 36, one or more dampeners 38, a first air spring 40, and a second air spring 42.

Figure 3:
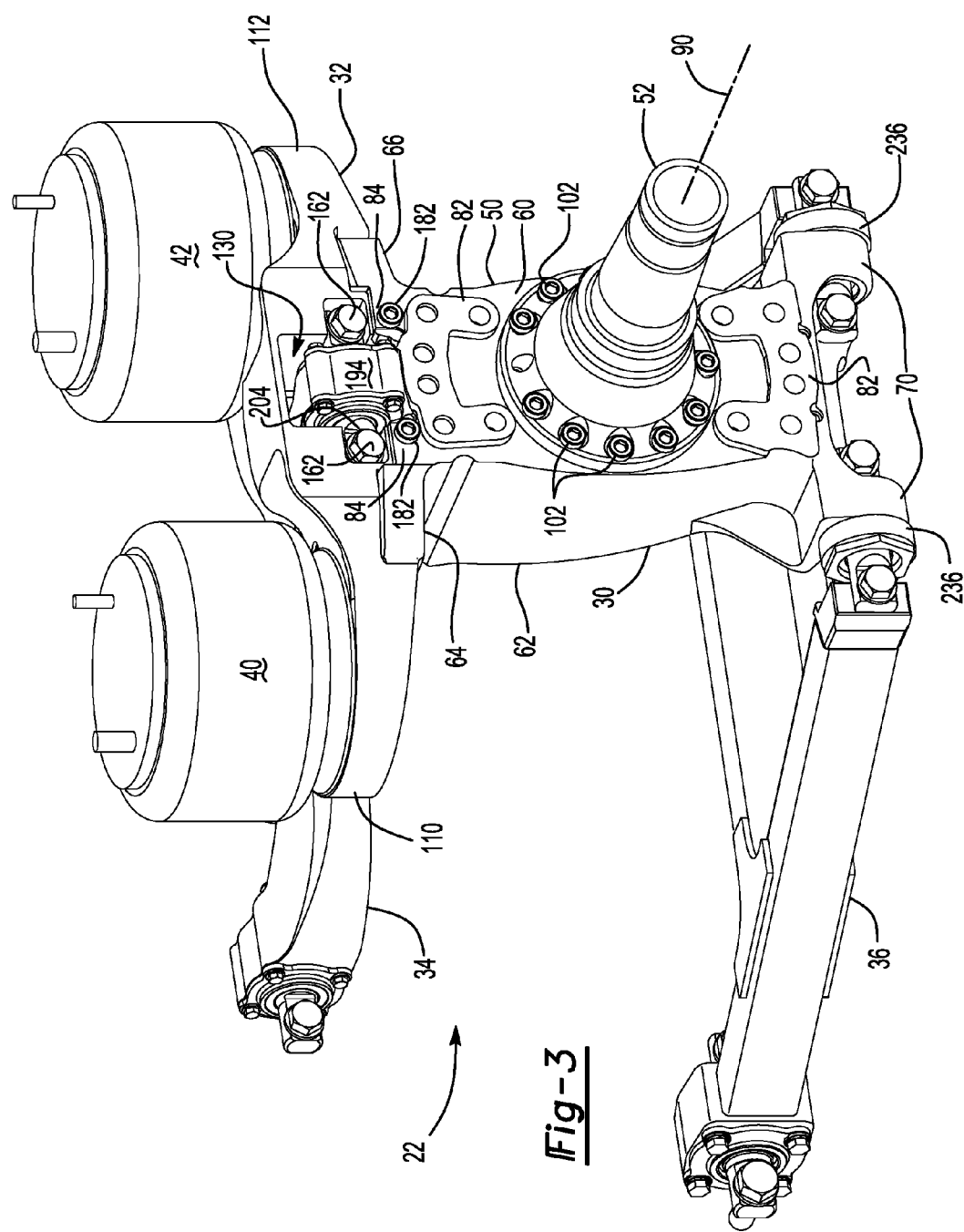
FIG. 3 is a perspective view of the suspension module without the wheel end assembly.
Figure 4:
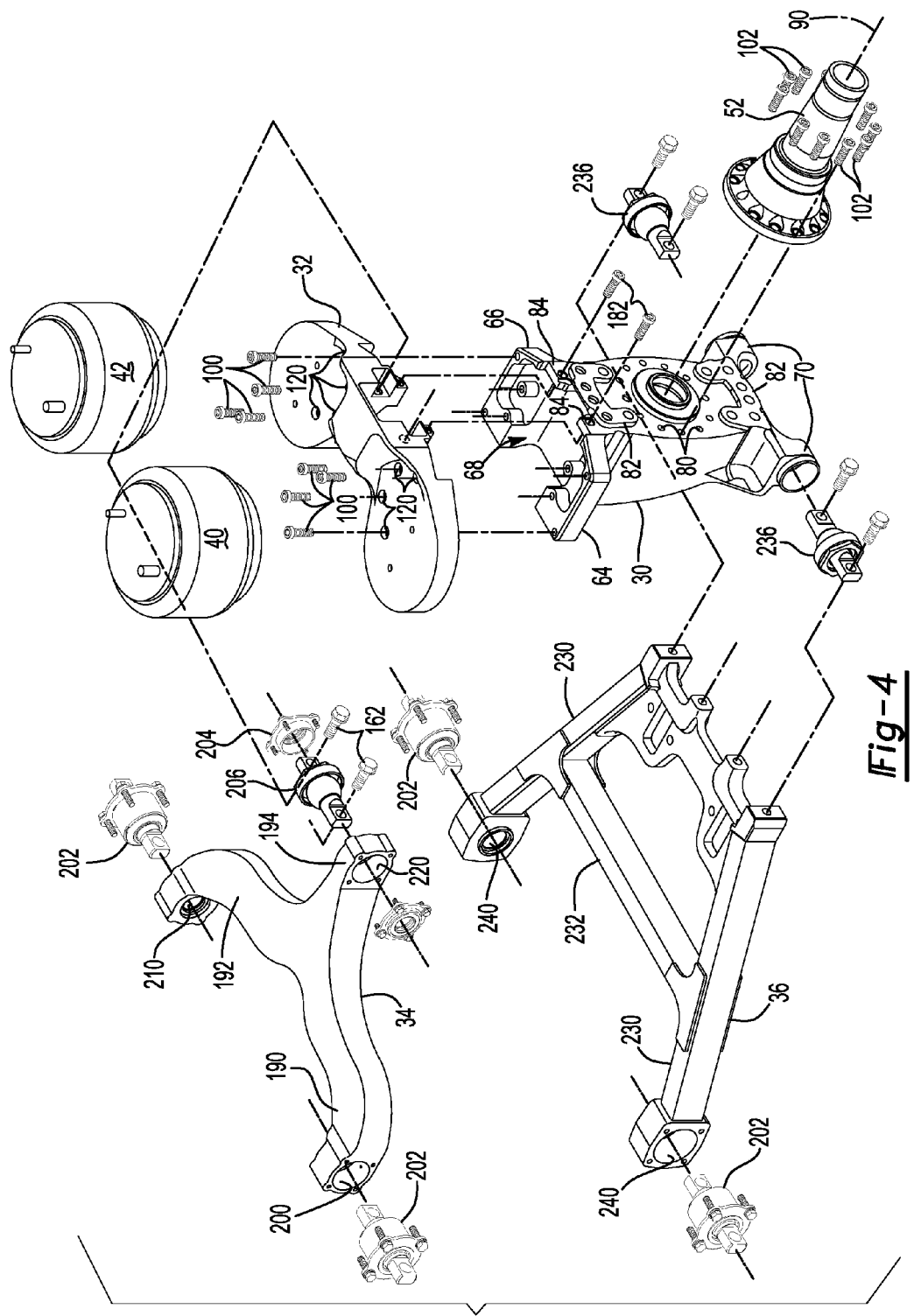
FIG. 4 is an exploded view of the suspension module.

Referring to FIGS. 3 and 4, the knuckle 30 may interconnect the wheel end assembly 24 to the upper control arm 34 and the lower control arm 36. The knuckle 30 may have a steerable configuration or a non-steerable configuration. A knuckle that has a steerable configuration may rotate about an axis with respect to the upper control arm 34 and the lower control arm 36 to steer or change the direction of travel of the vehicle 10. A knuckle that has a non-steerable configuration may not rotate about an axis to steer or change the direction of travel of the vehicle 10. In FIGS. 3 and 4, the knuckle 30 is depicted with a non-steerable configuration. The knuckle 30 may include a knuckle body 50 and a spindle 52.

The knuckle body 50 may facilitate mounting of various components to the knuckle 30. In at least one configuration, the knuckle body 50 may include an outboard side 60, an inboard side 62, a first wing 64, a second wing 66, a knuckle passage 68, and one or more lower control arm mounts 70.

The outboard side 60 face toward the wheel end assembly 24. A set of spindle mounting holes 80, one or more brake mounts 82, and one or more pedestal mounts 84 may be disposed proximate or provided with the outboard side 60.

Referring to FIG. 4, the spindle mounting holes 80 may be spaced apart from each other and may be arranged around an axis 90. The spindle mounting hole 80 may facilitate mounting of the spindle 52 to the knuckle body 50 as will be discussed in more detail below. It is also contemplated that the spindle mounting holes 80 may be omitted in various configurations, such as when the spindle 52 is integrally formed with the knuckle body 50.

Referring to FIGS. 3 and 4, one or more brake mounts 82 may be provided to facilitate mounting of the brake subsystem 26 to the knuckle 30. For example, the brake mounts 82 may facilitate mounting of a brake caliper of the brake subsystem 26 to the knuckle 30. The brake mounts 82 may extend from or may be disposed on the outboard side 60 of the knuckle body 50. In the configuration shown, two brake mounts 82 are shown in which one brake mounts 82 is disposed above the spindle 52 and the other brake mount 82 disposed below the spindle 52. Each brake mount 82 may include one or more mounting features that may facilitate mounting of the brake subsystem 26. In the configuration shown, the mounting features are configured as holes. One or more holes of each brake mount 82 may receive a fastener, such as a bolt, that may couple the brake caliper to the knuckle 30. For instance, one or more holes to the left of the axis 90 may receive fasteners when the brake caliper is mounted to the left of the axis 90 from the perspective shown while one or more holes to the right of the axis 90 may receive fasteners when the brake caliper is mounted to the right of the axis 90. The brake mount 82 disposed at the top of the knuckle body 50 may partially enclose at least partially define an end of the knuckle passage 68.

One or more pedestal mounts 84 may be provided to facilitate mounting of the pedestal 32. In the configuration shown, two pedestal mounts 84 are provided. The pedestal mounts 84 may be longitudinally positioned (e.g., positioned in a fore-aft direction that may be disposed perpendicular to the axis 90 in a generally horizontal direction) between the first wing 64 and the second wing 66. For instance, a first pedestal mount 84 may extend from the first wing 64 toward the second wing 66 and to the top brake mount 82 or brake mount that is located above the spindle 52 while a second pedestal mount 84 may extend from the second wing 66 toward the first wing 64 and to the top brake mount 82. The pedestal mounts 84 may be axially positioned or positioned in a direction that extends along axis 90 between the outboard side 60 and the inboard side 62. For example, the pedestal mounts 84 may be disposed between the top brake mount 82 and the knuckle passage 68. Each pedestal mount 84 may have a pedestal mounting feature, such as a hole that may receive a fastener that may couple the pedestal 32 to an associated pedestal mount 84.

The inboard side 62 may be disposed opposite the outboard side 60. As such, the inboard side 62 may face away from the wheel end assembly 24.

The first wing 64 may be disposed proximate the top of the knuckle body 50. For example, the first wing 64 may extend longitudinally outward from the knuckle body 50 in a direction that extends away from the knuckle passage 68. The first wing 64 may facilitate mounting of the pedestal 32 to the knuckle body 50. For example, the first wing 64 may include one or more holes that may receive pedestal fasteners 100, such as bolts, that may couple the pedestal 32 to the first wing 64. The holes may be threaded in one or more embodiments.

The second wing 66 may be disposed opposite the first wing 64. As such, the second wing 66 may be disposed proximate the top of the knuckle body 50 and may extend longitudinally outward from the knuckle body 50 in the opposite direction from the first wing 64. The second wing 66 may facilitate mounting of the pedestal 32 to the knuckle body 50. For example, the second wing 66 may include one or more holes that may receive pedestal fasteners 100 that may couple the pedestal 32 to the second wing 66.

Referring to FIG. 4, the knuckle passage 68 may be a recess that may extend downward from the top of the knuckle body 50 from the perspective shown. The knuckle passage 68 may be longitudinally positioned between the first wing 64 and the second wing 66. In addition, the knuckle passage 68 may extend laterally between the inboard side 62 and the outboard side 60. For instance, the knuckle passage 68 may extend from the inboard side 62 to the top brake mounts 82 and the pedestal mount 84. The knuckle passage 68 may partially define a passage that may receive the upper control arm 34 as will be discussed in more detail below.

Referring to FIGS. 3 and 4, one or more lower control arm mounts 70 may be provided with the knuckle body 50. In the configuration shown, two lower control arm mounts 70 are provided that are disposed below the first wing 64 and the second wing 66 and located proximate the bottom of the knuckle body 50. The lower control arm mounts 70 may have any suitable configuration. For instance, the lower control arm mounts 70 may be openings or apertures that may receive a pivot mechanism that may pivotally couple the knuckle 30 to the lower control arm 36.

The spindle 52 may extend from the knuckle body 50. More specifically, the spindle 52 may extend from the outboard side 60 of the knuckle body 50 in a direction that extends away from the inboard side 62. The spindle 52 may rotatably support the wheel end assembly 24. For example, the spindle 52 may support one or more wheel bearings that rotatably support a hub as will be discussed in more detail below. The spindle 52 may extend along or around the axis 90. In addition, the spindle 52 may be disposed between the brake mounts 82 in one or more configurations.

The spindle 52 may be integrally formed with the knuckle body 50 such that the spindle 52 and the knuckle body 50 are not separate components. Alternatively, the spindle 52 may be a separate component from the knuckle body 50. In the configuration shown in FIGS. 3 and 4, the spindle 52 is illustrated as a separate component from the knuckle body 50 that may be fixedly attached to the knuckle body 50 with a plurality of spindle fasteners 102, such as bolts. It is also contemplated that the spindle 52 may be attached to the knuckle body 50 in any suitable manner, such as with an interference fit, welding, or other fasteners such as snap rings.

Figure 5:
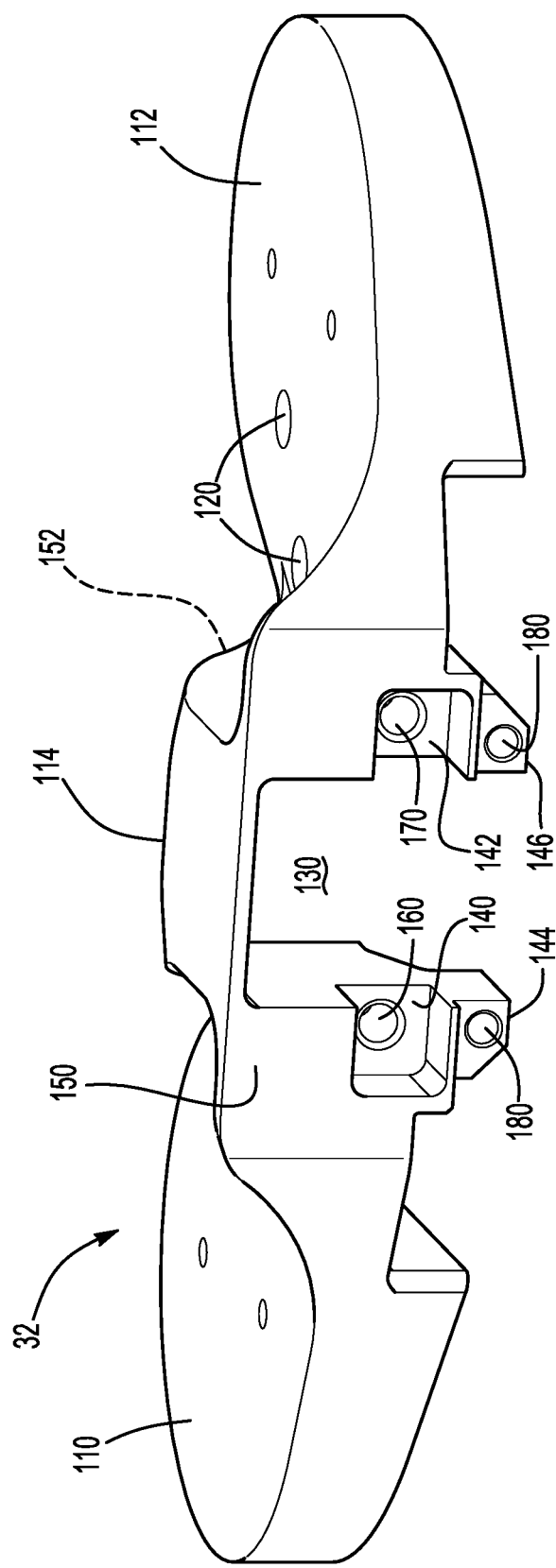
FIG. 5 is a perspective view of a pedestal that may be provided with the suspension module.

Referring to FIGS. 3-5, the pedestal 32 may support the first air spring 40 and the second air spring 42. In addition, the pedestal 32 may be fixedly disposed on the knuckle 30. In at least one configuration, the pedestal 32 may include a first lobe 110, a second lobe 112, and a bridge 114.

The first lobe 110 may support the first air spring 40. The first lobe 110 may extend from a first end of the bridge 114 and may be disposed proximate and may engage the first wing 64. For instance, the first lobe 110 may have a pocket that may receive the first wing 64. The first lobe 110 may have a first set of fastener openings 120. Each fastener opening 120 may be configured as a through hole that may extend through the first lobe 110. Each fastener opening 120 may be aligned with a corresponding hole in the first wing 64 such that a pedestal fastener 100 may extend through the fastener opening 120 to couple the first lobe 110 to the first wing 64.

The second lobe 112 may support the second air spring 42. The second lobe 112 may be disposed at an opposite end of the bridge 114 from the first lobe 110. As such, the second lobe 112 may extend from a second end of the bridge 114 and may be disposed proximate and may engage the second wing 66. For instance, the second lobe 112 may have a pocket that may receive the second wing 66. The second lobe 112 may also have fastener openings 120. Each fastener opening 120 may be configured as a through hole that may extend through the second lobe 112. Each fastener opening 120 may be aligned with a corresponding hole in the second wing 66 such that a pedestal fastener 100 may extend through the fastener opening 120 to couple the second lobe 112 to the second wing 66.

The bridge 114 may extend from the first lobe 110 to the second lobe 112. At least a portion of bridge 114 may be spaced apart from the knuckle 30 and may extend over the knuckle passage 68. As such, the bridge 114 and the portion of the knuckle 30 that defines the knuckle passage 68 may cooperate to define a passage 130. The passage 130 may receive the upper control arm 34 and a pivot mechanism that may pivotally couple the upper control arm to the pedestal 32 as will be discussed in more detail below. As is best shown in FIG. 5, the bridge 114 may include a first pivot pin recess 140, a second pivot pin recess 142, a first mounting tab 144, and a second mounting tab 146.

The first pivot pin recess 140 may be disposed adjacent to the first lobe 110. The first pivot pin recess 140 may extend from an outboard side 150 of the pedestal 32 that may face toward the wheel end assembly 24 toward an inboard side 152 of the pedestal 32 that may be disposed opposite the outboard side 150 and may face toward the subframe 20. The first pivot pin recess 140 may extend from the passage 130 toward the first lobe 110. As is best shown with additional reference to FIGS. 3 and 4, the first pivot pin recess 140 may receive a portion of a pivot mechanism, such as a pivot pin, that may pivotally couple the pedestal 32 to the upper control arm 34. A first pivot pin fastener hole 160 may extend from the first pivot pin recess 140 toward the subframe 20. The first pivot pin fastener hole 160 may receive a fastener 162, such as a bolt, that may fixedly couple the pivot mechanism to the pedestal 32.

Referring to FIG. 5, the second pivot pin recess 142 may be disposed opposite the first pivot pin recess 140. As such, the second pivot pin recess 142 may be disposed adjacent to the second lobe 112. The second pivot pin recess 142 may extend from the outboard side 150 of the pedestal 32 toward the inboard side 152. The second pivot pin recess 142 may also extend from the passage 130 toward the second lobe 112 and may receive an opposite end of the pivot mechanism. As is best shown with additional reference to FIGS. 3 and 4, a second pivot pin fastener hole 170 may extend from the second pivot pin recess 142 toward the subframe 20. The second pivot pin fastener hole 170 may receive another fastener 162 that may fixedly couple the pivot mechanism to the pedestal 32.

Referring to FIGS. 3-5, the first mounting tab 144 may extend between the first pivot pin recess 140 and the knuckle 30. As such, the first mounting tab 144 may extend in a downward direction and may engage the knuckle 30. The first mounting tab 144 may have a mounting tab hole 180 that may receive a fastener 182, such as a bolt that may fixedly couple the knuckle 30 to the pedestal 32. The first mounting tab 144 may be received in the passage 130 and may engage a corresponding pedestal mount 84 of the knuckle 30 to help inhibit axial movement of the pedestal 32 away from the subframe 20.

The second mounting tab 146 may extend between the second pivot pin recess 142 and the knuckle 30. As such, the second mounting tab 146 may extend in a downward direction and may engage the knuckle 30. The second mounting tab 146 may have a mounting tab hole 180 that may receive a fastener 182 that may fixedly couple the knuckle 30 to the pedestal 32. The second mounting tab 146 may be received in the passage 130 and may engage a corresponding pedestal mount 84 of the knuckle 30.

Referring to FIG. 1, the upper control arm 34 may extend from a lateral side of the subframe 20 toward the pedestal 32. The upper control arm 34 may be pivotally or rotatably mounted to the subframe 20 and the pedestal 32 in a manner that allows the knuckle 30, pedestal 32, and a corresponding wheel end assembly 24 to move up and down while inhibiting forward and backward movement. As is best shown with reference to FIG. 4, the upper control arm 34 may have a Y-shaped configuration and may include a first mounting arm 190, a second mounting arm 192, and a center arm 194.

Referring to FIGS. 1 and 4, the first mounting arm 190 may extend from the center arm 194 may be pivotally coupled to the subframe 20. As such, the first mounting arm 190 may extend away from the pedestal 32 and may rotate about a first upper control arm axis 196. The first mounting arm 190 may have a generally L-shaped configuration in one or more embodiments. For example, the first mounting arm 190 may include a first aperture 200 that may be disposed proximate a distal end of the first mounting arm 190. The first aperture 200 may receive a pivot mechanism 202 that may pivotally couple the first mounting arm 190 to the subframe 20. The pivot mechanism 202 may have any suitable configuration. For example, the pivot mechanism 202 may include a pivot pin that may extend through the first aperture 200. The pivot pin may be fixedly coupled to the subframe 20 in any suitable manner, such as with one or more fasteners like bolts.

The second mounting arm 192 may be disposed opposite the first mounting arm 190. The second mounting arm 192 may extend from the center arm 194 may be pivotally coupled to the subframe 20. As such, the second mounting arm 192 may extend away from the pedestal 32 and may rotate about the first upper control arm axis 196. The second mounting arm 192 may include a second aperture 210 that may be disposed proximate a distal end of the second mounting arm 192. The second aperture 210 may receive another pivot mechanism 202 that may pivotally couple the second mounting arm 192 to the subframe 20. The second mounting arm 192 may be configured as a mirror image of the first mounting arm 190 in one or more configurations.

The center arm 194 may be disposed between the first mounting arm 190 and the second mounting arm 192. In addition, the center arm 194 may extend away from the subframe 20 or extend in the opposite direction with respect to the first mounting arm 190 and the second mounting arm 192. The center arm 194 may have a substantially straight or linear configuration in one or more embodiments and may be disposed directly above the axis 90 or directly above a portion of the spindle 52. The center arm 194 may be pivotally coupled to the pedestal 32. As such, the pedestal 32 may rotate about a second upper control arm axis 212 with respect to the upper control arm 34. Moreover, the center arm 194 may be the only arm of the upper control arm 34 that may be mounted to the pedestal 32. For example, the center arm 194 may include a center arm aperture 220 that may receive a pivot mechanism 204 that may pivotally couple the center arm 194 to the pedestal 32. The pivot mechanism 204 may at least partially received in the passage 130 and may be received in the first pivot pin recess 140 and the second pivot pin recess 142. The pivot pin 206 of the pivot mechanism 204 may be fixedly coupled to the pedestal 32 in any suitable manner, such as with one or more fasteners 162. A portion of the center arm 194 and at least a portion of the center arm aperture 220 may be received in the passage 130. For instance, the center arm 194 may extend completely through the passage 130 and protrude from the pedestal 32. A portion of the center arm 194 may be longitudinally positioned between the first lobe 110 and the second lobe 112 of the pedestal 32 and between the first air spring 40 and the second air spring 42. In addition, a portion of the center arm 194 and at least a portion of the center arm aperture 220 and its associated pivot mechanism 202 may be received between the knuckle 30 and the pedestal 32.

Referring to FIG. 1, the lower control arm 36 may be disposed below the upper control arm 34. The lower control arm 36 may extend from a lateral side of the subframe 20 toward the knuckle 30. The lower control arm 36 may be pivotally or rotatably mounted to the subframe 20 and the knuckle 30 in a manner that allows the knuckle 30, pedestal 32, and a corresponding wheel end assembly 24 to move up and down while inhibiting forward and backward movement. The lower control arm 36 may have a different configuration than the upper control arm 34. For instance, the lower control arm 36 may have generally H-shaped configuration as is best shown with reference to FIG. 4 and may include a pair of side arms 230 and a cross member 232.

Referring to FIGS. 1 and 4, the side arms 230 may be disposed on opposite sides of the knuckle 30. Each side arm 230 may have a side arm aperture 240 that may be disposed proximate an end of the side arm 230 that is disposed adjacent to the subframe 20. The side arm aperture 240 may receive a pivot mechanism 202 that may pivotally couple the side arm 230 to the subframe 20. The pivot mechanisms 202 may be coaxially disposed and may allow the lower control arm 36 to rotate about a first lower control arm axis 234. As is best shown in FIG. 1, the first lower control arm axis 234 may be offset from the first upper control arm axis 196. Another pivot mechanism 236 may be coupled to an opposite end of each side arm 230. These pivot mechanisms 236 may also be coaxially disposed and may allow the knuckle 30 to rotate about a second lower control arm axis 238 with respect to the lower control arm 36. The second lower control arm axis 238 may be coplanar with the second upper control arm axis 212 in one or more embodiments. The pivot mechanism 236 may extend through a lower control arm mount 70 of the knuckle 30 and may be coupled to the side arm 230 with fasteners such as bolts.

The cross member 232 may interconnect the side arms 230. The cross member 232 may be disposed between the subframe 20 and the knuckle 30.

An upper control arm 34 and a lower control arm 36 may be associated with each wheel end assembly 24. As such, two upper control arms 34 and two lower control arms 36 may be provided that may extend from opposite sides of the subframe 20 to support different wheel end assemblies 24.

Referring to FIGS. 1 and 2, one or more dampeners 38 may be provided to control and dampen movement of the suspension module 22. A dampener 38 may have any suitable configuration. For example, a dampener 38 may be configured as a shock absorber, coil spring, or combinations thereof. In FIGS. 1 and 2, a dampener 38 is shown that is configured as a shock absorber that has a first end and a second end. The first end may be disposed proximate or may be pivotally coupled to the lower control arm 36. The second end may be disposed opposite the first end that may be pivotally coupled to another component, such as chassis or subframe 20.

Referring to FIGS. 1-4, the first air spring 40 and the second air spring 42 may help dampen vibrations, provide a desired level of ride quality, and control ride height or the distance between the chassis and the road or support surface upon which a tire of the vehicle 10 is disposed.

The first air spring 40 may be fixedly disposed on the first lobe 110 of the pedestal 32. For example, the first air spring 40 may extend from the first lobe 110 to a frame or chassis of the vehicle 10. The first air spring 40 may have any suitable configuration. For instance, the first air spring 40 may have a flexible bellows and a piston. The flexible bellows may at least partially define a chamber within the first air spring 40 that may receive the piston and pressurized gas that may be provided by a pressurized gas supply system. Pressurized gas may be provided to the chamber or may be vented from the chamber to adjust the ride height and dampening characteristics of the suspension system. An upper mounting plate may be provided at the top of the flexible bellows to facilitate mounting of the flexible bellows to the frame or chassis. The piston may be at least partially received in the flexible bellows and may extend from the pedestal 32 toward the upper mounting plate. For example, the piston may be fixedly disposed on the pedestal 32, such as with one or more fasteners, and may be generally disposed near the center of the flexible bellows.

The second air spring 42 may have a similar configuration or the same configuration as the first air spring 40. The second air spring 42 may be fixedly disposed on the second lobe 112 of the pedestal 32. For example, second air spring 42 may extend from the second lobe 112 to a frame or chassis of the vehicle 10. As such, the first air spring 40 and the second air spring 42 may be disposed on opposite sides of the upper control arm 34.

Referring to FIGS. 1 and 2, the wheel end assembly 24 may facilitate rotation a wheel that may support a tire. The wheel end assembly 24 may be part of a drive axle or a non-drive axle. A drive axle may receive torque from a power source, such as an internal combustion engine or electric motor. In a drive axle configuration, a shaft 250, such as an axle shaft or half shaft, may transmit torque to the wheel end assembly 24 to rotate a wheel that may be mounted on the wheel end assembly 24. For instance, the shaft 250 may be operatively connected at a first end to a vehicle drivetrain component like a differential or gearbox and may extend through the spindle 52 and be coupled to the wheel end assembly 24 at a second end. The shaft may be omitted in a non-drive axle configuration. In at least one configuration, the wheel end assembly 24 may include a hub 260.

The hub 260 may be rotatably disposed on the spindle 52. For example, one or more wheel bearings may be disposed on the spindle 52 and may rotatably support the hub 260. The hub 260 may facilitate mounting of the wheel, such as with a plurality of mounting studs 262. As such, the hub 260 and the wheel may rotate together about the axis 90. A tire may be disposed on the wheel that may engage a road or support surface.

The brake subsystem 26 may facilitate braking of the wheel to slow rotation of the hub 260 and an associated wheel about the axis 90. The brake subsystem 26 may have any suitable configuration. For instance, the brake subsystem 26 may be configured as a friction brake, such as a disc brake or a drum brake. In FIGS. 1 and 2, the brake subsystem 26 is configured as a disc brake. In such a configuration, a brake friction member 270 configured as a brake rotor may be fixedly coupled to the hub 260 and may rotate with the hub 260. One or more brake pads may be actuated into engagement with the brake friction member 270 to slow rotation of the hub 260 and the wheel about the axis 90.

The suspension module described above may improve packaging and performance of a vehicle suspension system. For instance, the upper control arm may attach to a pedestal rather than directly to a knuckle, which may reduce the number of attachment points, complexity, and cost. The suspension module may also allow the air springs to be positioned laterally between the frame rail or of the vehicle and a tire. Providing to air springs in this manner may allow smaller air springs or smaller diameter air springs to be used as compared to a configuration that uses a single air spring, which may reduce the lateral width of the suspension module. Moreover, the air springs may be provided without a guidance mechanism, such as a platform that rotates with respect to the knuckle or sliding damper, which may reduce cost and complexity and may reduce stress and vertical bending loads on the upper control arm, lower control arm, or both. In addition, the attachment point for the upper control arm may be moved further outboard or away from the frame rail by positioning the upper control arm between the air springs and attaching the upper control arm to the pedestal, which may reduce camber variation and tire wear or tire "scrub". In addition, the overall package height of the suspension module may be reduced as the pedestal may allow the air springs to be mounted at a lower height, such as in line with the upper control arm rather than above the upper control arm.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension module comprising:
    a knuckle;
    a pedestal that is fixedly disposed on the knuckle;
    first and second air springs disposed on the pedestal; and
    an upper control arm that is pivotally mounted to the pedestal between the first and second air springs.

2. The suspension module of claim 1 wherein the upper control arm is received between the knuckle and the pedestal.

3. The suspension module of claim 1 wherein the knuckle and the pedestal cooperate to define a passage that receives the upper control arm.

4. The suspension module of claim 3 wherein the passage receives a pivot mechanism that pivotally couples the upper control arm to the pedestal.

5. The suspension module of claim 4 wherein the pivot mechanism is disposed between the first and second air springs.

6. The suspension module of claim 4 wherein the pedestal has a first lobe, a second lobe, and a bridge that extends from the first lobe to the second lobe, wherein the first air spring is fixedly disposed on the first lobe and the second air spring is fixedly disposed on the second lobe.

7. The suspension module of claim 6 wherein a first set of fasteners extends through the first lobe and the second lobe to the knuckle to fixedly couple the pedestal to the knuckle.

8. The suspension module of claim 6 wherein the passage is partially defined by the bridge and the upper control arm extends completely through the passage and the pedestal.

9. The suspension module of claim 6 wherein the pivot mechanism includes a pivot pin and the bridge includes a first pivot pin recess and a second pivot pin recess that receive the pivot pin, wherein the first pivot pin recess extends from the passage toward the first lobe and the second pivot pin recess extends from the passage toward the second lobe.

10. The suspension module of claim 9 wherein the first pivot pin recess and the second pivot pin recess extend from an outboard side of the bridge toward an inboard side of the bridge that is disposed opposite the outboard side.

11. The suspension module of claim 10 wherein the bridge includes a first mounting tab that is disposed between the first pivot pin recess and the knuckle and a second mounting tab that is disposed between the second pivot pin recess to the knuckle.

12. The suspension module of claim 11 wherein the first mounting tab and the second mounting tab each receive a fastener that couples the knuckle to the pedestal.

13. The suspension module of claim 12 wherein the first mounting tab and the second mounting tab are received in the passage.

14. A suspension module comprising:
    a knuckle;
    a pedestal that is fixedly attached to the knuckle;
    first and second air springs disposed on the pedestal;
    a lower control arm that is pivotally mounted to the knuckle at an end of the knuckle that is disposed opposite the pedestal; and
    an upper control arm that is pivotally mounted to the pedestal between the pedestal and the knuckle.

15. The suspension module of claim 14 wherein the upper control arm is disposed between the first and second air springs and does not engage the knuckle.

16. The suspension module of claim 14 wherein the upper control arm has a Y-shaped configuration that includes a center arm that is pivotally coupled to the pedestal and first and second mounting arms that extend from the center arm and extend away from the pedestal.

17. The suspension module of claim 16 wherein the upper control arm is pivotally mounted to the pedestal only with the center arm.

18. The suspension module of claim 16 wherein the center arm is disposed between the first and second air springs.

19. The suspension module of claim 16 wherein the knuckle has a spindle and the center arm is disposed directly above the spindle.

20. The suspension module claim 16 wherein the knuckle and the pedestal cooperate to define a passage that receives the center arm.

* * * * *